United States Patent
Tanaka

(10) Patent No.: US 10,810,820 B2
(45) Date of Patent: Oct. 20, 2020

(54) PAYMENT SYSTEM USING BIOMETRIC DATA HAVING SECURITY SECURED, AND BIOMETRIC DATA REGISTRATION SYSTEM

(71) Applicant: Brainy Inc., Naha-shi, Okinawa (JP)

(72) Inventor: Masashi Tanaka, Naha (JP)

(73) Assignee: BRAINY INC., Naha-Shi (JP)

( * ) Notice: Subject to any disclaimer, the term of this patent is extended or adjusted under 35 U.S.C. 154(b) by 0 days.

(21) Appl. No.: 16/657,970

(22) Filed: Oct. 18, 2019

(65) Prior Publication Data

US 2020/0051360 A1 Feb. 13, 2020

Related U.S. Application Data

(63) Continuation of application No. 16/170,328, filed as application No. PCT/JP2016/063280 on Apr. 27, 2016, now Pat. No. 10,521,994.

(51) Int. Cl.
*G06K 5/00* (2006.01)
*G07F 7/08* (2006.01)
(Continued)

(52) U.S. Cl.
CPC ....... *G07F 7/0813* (2013.01); *G06Q 20/3574* (2013.01); *G06Q 20/36* (2013.01);
(Continued)

(58) Field of Classification Search
CPC ........ G07F 7/1008; G07F 7/08; G06Q 20/341
(Continued)

(56) References Cited

U.S. PATENT DOCUMENTS 10,521,994 B2 * 12/2019 Tanaka ................... G06Q 20/36
2004/0129787 A1 7/2004 Saito et al.
(Continued)

FOREIGN PATENT DOCUMENTS

JP 2002269051 A 9/2002
JP 2005275459 A 10/2005
(Continued)

OTHER PUBLICATIONS

ISA Japanese Patent Office, International Search Report and Written Opinion Issued in Application No. PCT/JP2016/063280, dated Aug. 9, 2016, WIPO, 13 pages.
(Continued)

*Primary Examiner* — Ahshik Kim
(74) *Attorney, Agent, or Firm* — McCoy Russell LLP

(57) ABSTRACT

Provided is a biometric data registration system, which displays screen data for causing a user to select whether a destination of registration of the user's biometric data is a card for payment or a registration destination server device, accepts from the user a selection of the destination of registration, and acquires the user's biometric data. If the selection indicates the card for payment, the biometric data registration system stores the biometric data in a first storage unit which is for managing data which is stored in a storage medium of the card for payment, whereas if the selection indicates the registration destination server device, the biometric data registration system stores the biometric data in a second storage unit which corresponds to the registration destination server device.

9 Claims, 7 Drawing Sheets

(51) Int. Cl.
 *G06Q 20/40* (2012.01)
 *G06Q 20/36* (2012.01)
 *G06Q 20/34* (2012.01)

(52) U.S. Cl.
 CPC ........... *G06Q 20/40* (2013.01); *G06Q 20/409* (2013.01); *G06Q 20/40145* (2013.01)

(58) Field of Classification Search
 USPC ........................................................ 235/380
 See application file for complete search history.

(56) References Cited

U.S. PATENT DOCUMENTS

| | | | | |
|---|---|---|---|---|
| 2016/0071099 | A1* | 3/2016 | Lazay | G06Q 20/10 705/44 |
| 2016/0155114 | A1* | 6/2016 | Kerridge | G06Q 20/3223 705/21 |
| 2017/0017957 | A1* | 1/2017 | Radu | G06Q 20/363 |
| 2017/0116614 | A1 | 4/2017 | Tanaka | |
| 2018/0219680 | A1 | 8/2018 | Kamal et al. | |
| 2018/0357644 | A1 | 12/2018 | Tabe | |
| 2019/0139027 | A1 | 5/2019 | Zarakas et al. | |

FOREIGN PATENT DOCUMENTS

| | | |
|---|---|---|
| JP | 2007052680 A | 3/2007 |
| JP | 2008046906 A | 2/2008 |
| JP | 2008107934 A | 5/2008 |
| JP | 5713516 B1 | 5/2015 |

OTHER PUBLICATIONS

Japanese Patent Office, Office Action Issued in Application No. 2017-146876, dated Jun. 23, 2020, 8 pages. (Submitted with Machine Translation).

\* cited by examiner

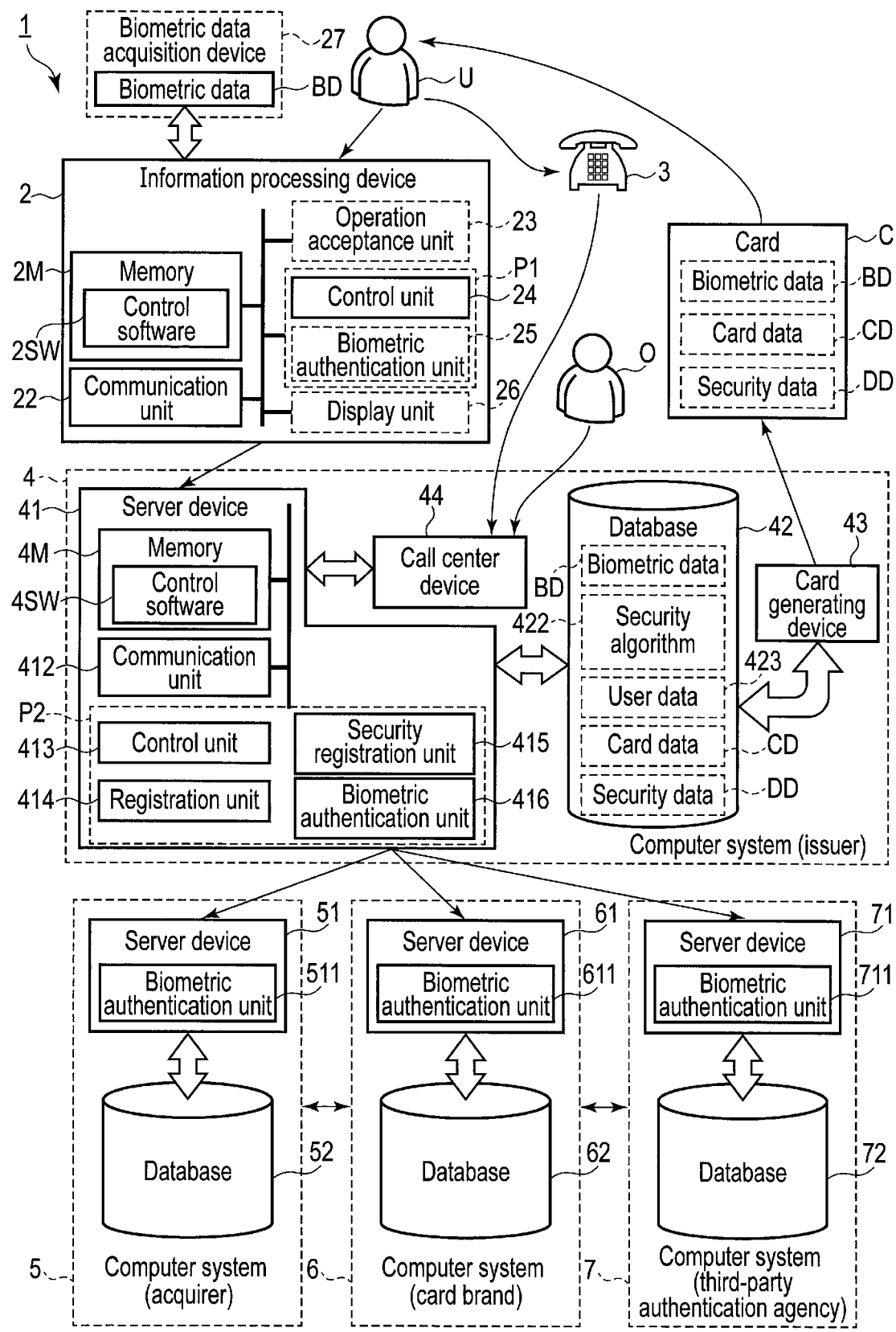
F I G. 1

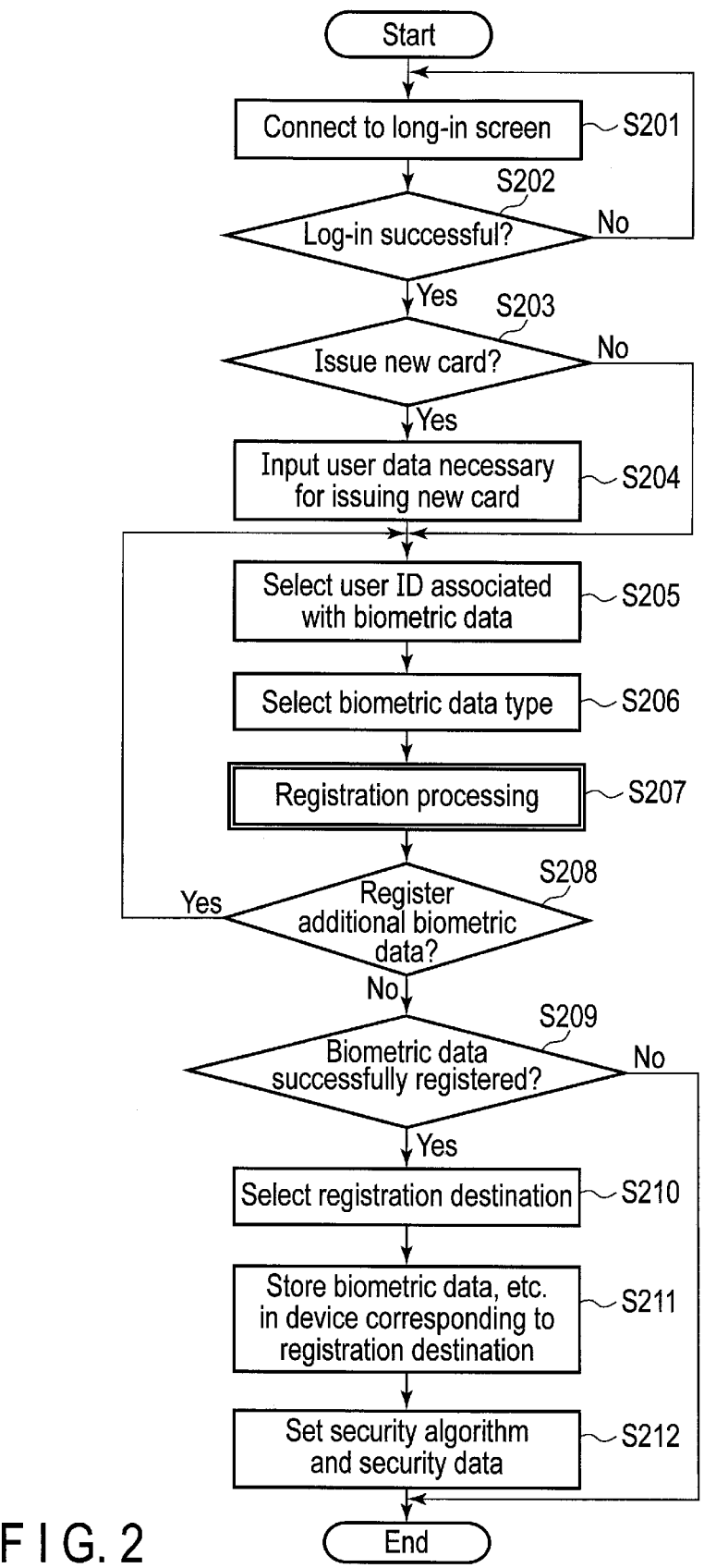
F I G. 2

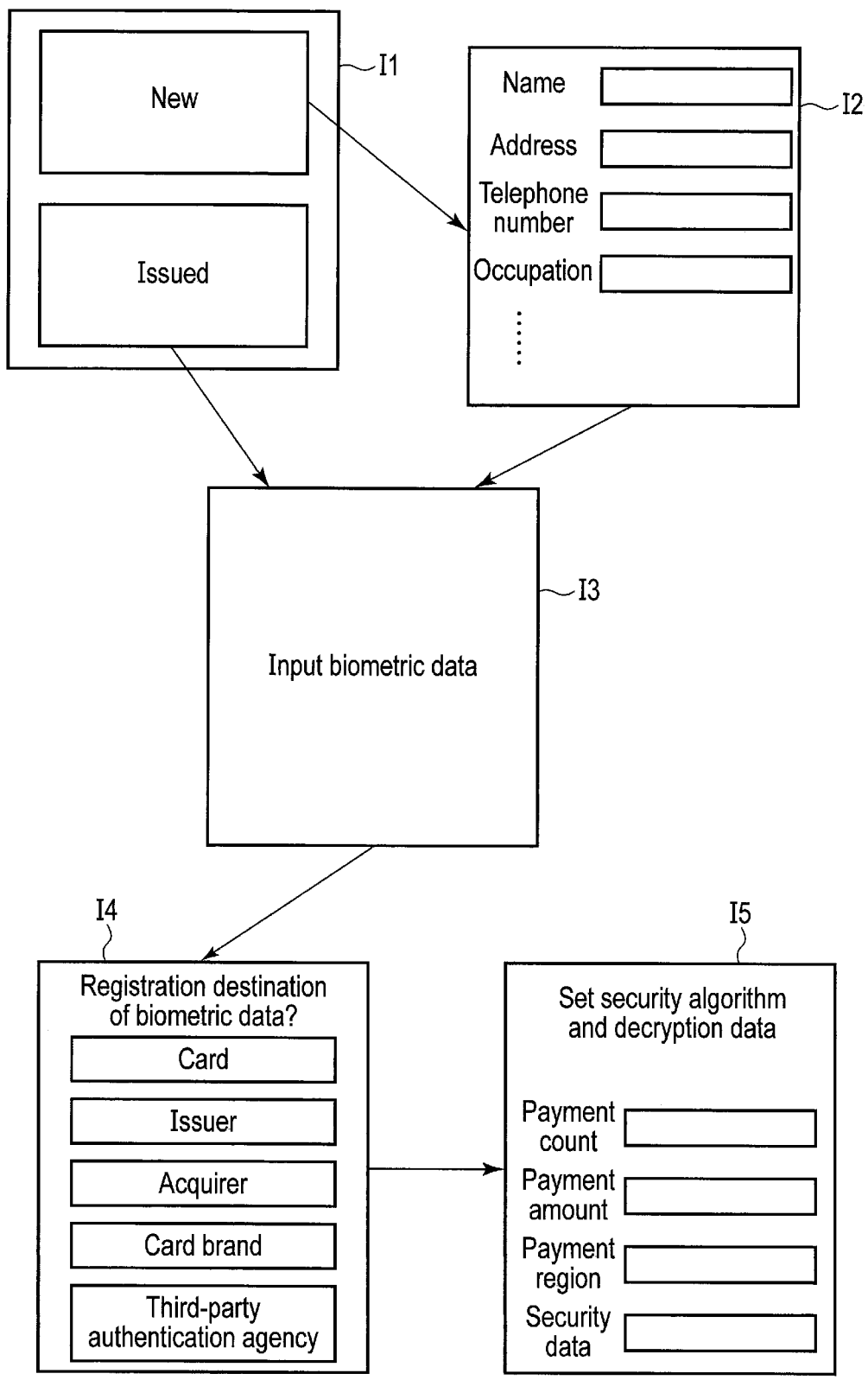
F I G. 5

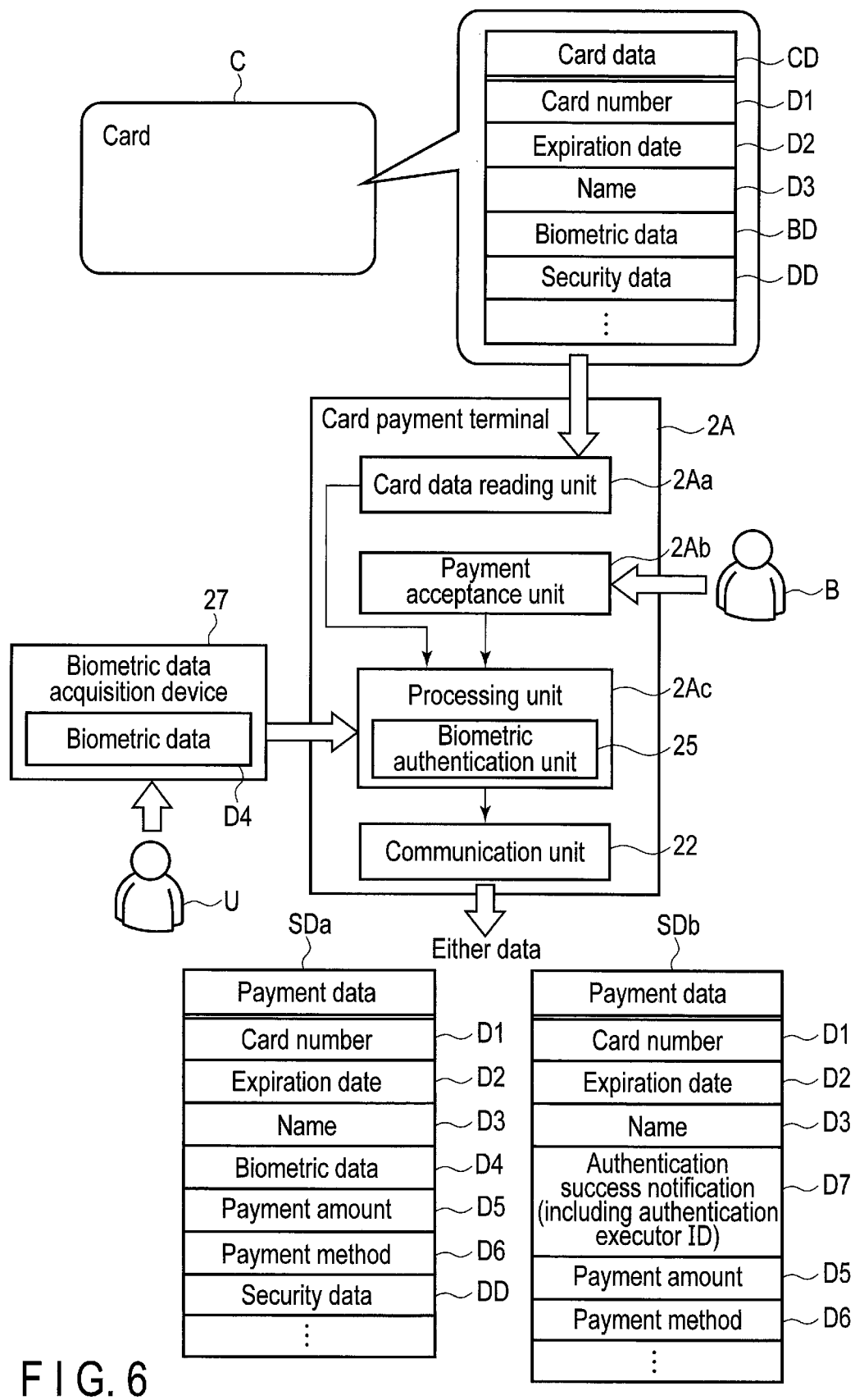
F I G. 6

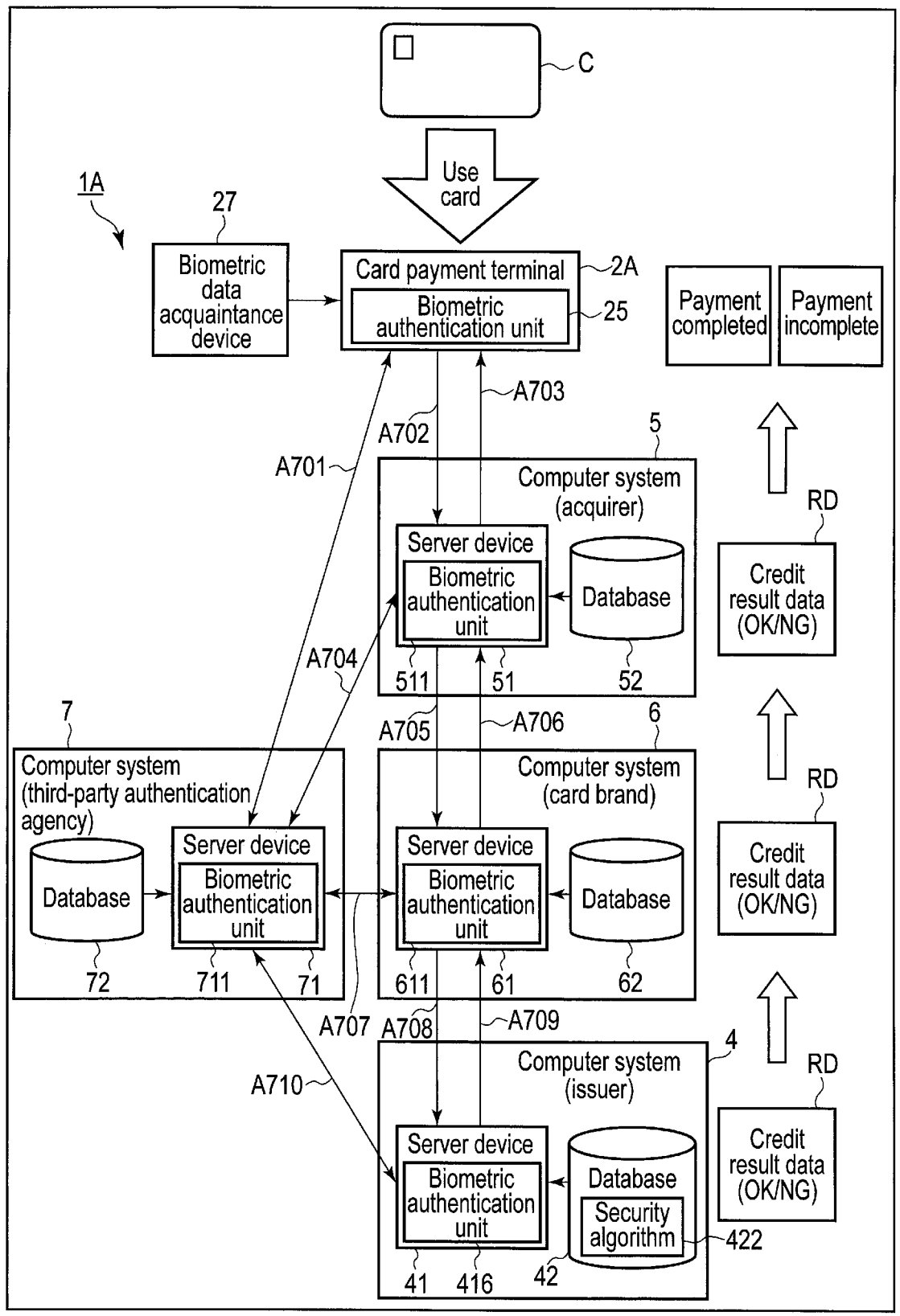
F I G. 7

PAYMENT SYSTEM USING BIOMETRIC DATA HAVING SECURITY SECURED, AND BIOMETRIC DATA REGISTRATION SYSTEM

CROSS-REFERENCE TO RELATED APPLICATIONS

The present application is a continuation of U.S. patent application Ser. No. 16/170,328, entitled "BIOMETRIC DATA REGISTRATION SYSTEM AND PAYMENT SYSTEM," filed on Oct. 25, 2018. U.S. patent application Ser. No. 16/170,328 is a continuation of International Application No. PCT/JP2016/063280, filed on Apr. 27, 2016. The entire contents of the above-listed application are hereby incorporated by reference in entirety for all purposes.

TECHNICAL FIELD

1. Field of the Invention

The present invention relates to a biometric data registration system and a payment system.

2. Description of the Related Art

For example, fake sign, analysis of the personal identification number, skimming, card forgery, fraudulent use of credit cards, such as relatives' unauthorized use should be prevented. In recent years, biometric authentication has been used to enhance security.

As an example of a system for confirming a user based on biometric authentication, an automated teller machine (ATM) for inquiring the balance of deposits and savings of a bank, depositing/withdrawing money, and transfer processing has been employed. In such a banking system, the ATM acquires user's biometric data and transmits it to the bank server. The server executes biometric authentication for collating the user's biometric data received from the ATM with biometric data registered in a database.

In addition, a technology of allowing a fingerprint sensor to be attached to a credit card and collating fingerprint data stored in the credit card with user's fingerprint data acquired by the fingerprint sensor in the credit card has also been developed.

Furthermore, a technology by which a card payment terminal acquires biometric data stored in a credit card, acquires user's biometric data through a sensor provided in the card payment terminal, and the card payment terminal collates the acquired biometric data is disclosed in JP 5713516 B.

BACKGROUND AND SUMMARY

In the system of confirming the user based on the biometric authentication, the user's biometric data need to be registered in advance. However, as the number of users increases and the number of registration destinations of biometric data increases, the burden of registering the biometric data increases.

The present invention has been made in view of the above circumstances, and provides a biometric data registration system and a payment system for registering user's biometric data easily and efficiently.

A biometric data registration system according to one aspect of the present invention includes an information processing device and a server device capable of communicating with the information processing device. The information processing device includes a display unit, an operation acceptance unit, a biometric data acquisition unit, and a first communication unit. The display unit displays first screen data which causes a user to select a card for payment or a registration destination server device as a registration destination of biometric data of the user. The operation acceptance unit accepts an instruction of input of the biometric data from the user and accepts a first selection as a selection of the registration destination. The biometric data acquaintance unit acquires the biometric data of the user if the operation acceptance unit accepts the instruction of the input of the biometric data. The first communication unit transmits the biometric data and the first selection to the server device. The server device includes a second communication unit and a registration unit. The second communication unit receives the biometric data and the first selection from the information processing device. The registration unit stores the biometric data in a first storage unit for managing data to be stored in a storage medium of the card for payment if the first selection indicates the card for payment, and stores the biometric data in a second storage unit corresponding to the registration destination server device if the first selection indicates the registration destination server device.

According to the present invention, the user's biometric data used for biometric authentication can be registered easily and efficiently.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an example of a configuration of a biometric data registration system according to the present embodiment.

FIG. 2 is a flowchart showing a first example of biometric data registration processing according to the present embodiment.

FIG. 5 is a diagram showing an example of screen transition in the biometric data registration system according to the present embodiment.

FIG. 6 is a block diagram showing an example of a configuration of a card payment terminal using biometric authentication.

FIG. 7 is a block diagram showing an example of a configuration of an electronic payment system using the biometric authentication.

DETAILED DESCRIPTION OF THE DRAWINGS

Figure 3:
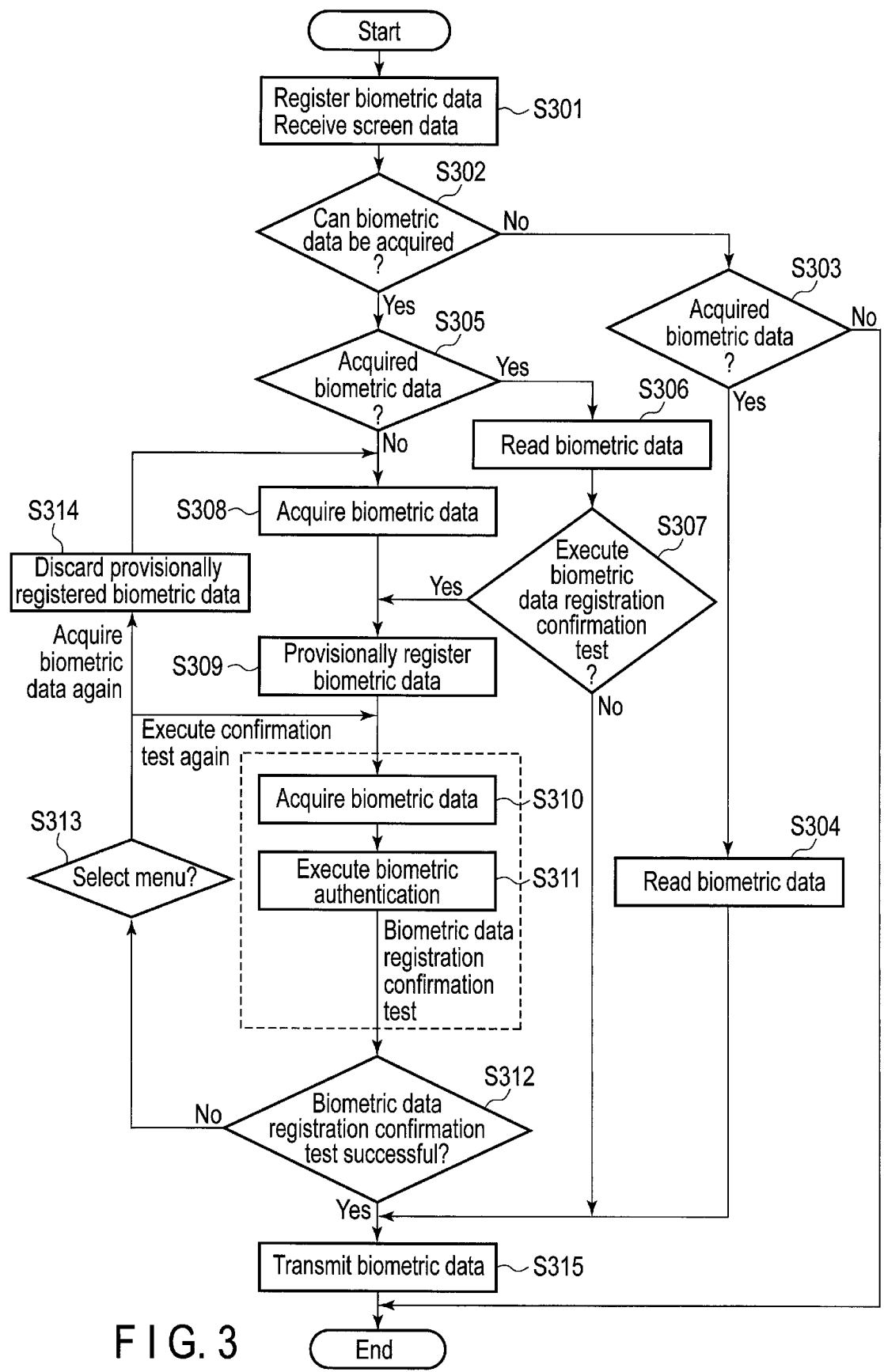
FIG. 3 is a flowchart showing an example of registration processing according to the present embodiment.

Various embodiments will be described hereinafter with reference to the accompanying drawings. In the following descriptions, approximately or substantially the same functions and constituent elements are denoted by the same reference numerals and explained as needed.

In the present embodiment, a biometric data registration system for registering biometric data of a user and an electronic payment system for performing biometric authentication for the user using the registered biometric data will be described.

In the present embodiment, the identification information is referred to as an ID.

In the present embodiment, the biometric data may be, for example, fingerprint data, vein data, artery data, hand shape data, retinal data, iris data, face data, blood vessel data, voice data, voice print data, ear data, or other data.

In the present embodiment, a case where the payment performed by the user is card payment will be described. The card type may be, for example, a credit card, a debit card, a prepaid card, an electronic money card, a point card, a cash card, or a card for the other electronic payment. However, the present embodiment can also be applied to a case where the medium or product used for the payment is not a card.

In the present embodiment, data security on means that data is protected, and data security off means that data is not protected.

FIG. 1 is a block diagram showing an example of a configuration of a biometric data registration system 1 according to the present embodiment.

For example, the biometric data registration system 1 includes an information processing device 2, a computer system 4 of an issuer (card issuing company), a computer system 5 of an acquirer (card payment company), a computer system 6 of a card brand, and a computer system 7 of a third-party authentication agency.

The information processing device 2 is a terminal by which a user U acquires the biometric data BD, registers the biometric data BD, performs biometric authentication using the biometric data BD and payment, and the like. The information processing device 2 may be, for example, a smartphone, a mobile phone, a payment terminal, an ATM, a telephone, a point-of-sale (POS) terminal, a personal computer, or the like.

The information processing device 2 includes, for example, a communication unit 22, an operation acceptance unit 23, a processor P1, a display unit 26, and a memory 2M. In addition, the information processing device 2 is connected to a biometric data acquisition device 27 which acquires the biometric data BD of the user U. The information processing device 2 may include the biometric data acquisition device 27. At least one of the communication unit 22, the operation acceptance unit 23, the display unit 26, or the memory 2M may be a device externally attached to the information processing device 2.

The communication unit 22 performs transmission and reception of commands, addresses, data, information, instructions, signals, or the like to and from, for example, another device such as the issuer's computer system 4, the acquirer's computer system 5, the card brand computer system 6, or the computer system 7 of the third-party authentication agency.

The operation acceptance unit 23 is a device which accepts an operation of the user U, and may be, for example, a pointing device, a keyboard, a touch panel, various sensors, or the like.

The processor P1 may be, for example, a Central Processing Unit (CPU), Micro-Processing Unit (MPU), a Digital Signal Processor (DSP), or the like. The memory 2M may be used as, for example, a main memory. The memory 2M follows a control from the processor P1. Data processed by the processor P1 and the like are provisionally stored in the memory 2M under the control of the processor P1. The memory 2M stores, for example, the control software 2SW in a nonvolatile storage area. The memory 2M may be incorporated in the processor P1.

The processor P1 may implement the functions of a control unit 24 and a biometric authentication unit 25 by executing the control software 2SW of the memory 2M.

The control unit 24 controls the communication unit 22, the operation acceptance unit 23, the biometric authentication unit 25, the memory 2M, the display unit 26, and the biometric data acquisition device 27 incorporated in the information processing device 2. For example, the control unit 24 sends a command to the biometric data acquisition device 27 connected to the information processing device 2, thereby causing the biometric data acquisition device 27 to acquire biometric data BD of the user U to be registered.

For example, the biometric authentication unit 25 performs biometric authentication using the biometric data of the user U received from the biometric data acquisition device 27. The biometric data acquisition device 27 may be incorporated in the information processing device 2. The biometric authentication unit 25 may be incorporated in the control unit 24.

The display unit 26 includes, for example, a display. For example, the display unit 26 may display data under control of a browser (software for browsing website) executed by the processor P1.

The issuer's computer system 4 includes, for example, a server device 41, a database 42, a card generating device 43, and a call center device 44.

In the present embodiment, a case where the issuer's computer system 4 executes main processing for registering the biometric data BD will be described as an example. However, the other computer system which is not the issuer's computer system 4 may execute the main processing for registering the biometric data BD. For example, a computer system of a service provider providing a registration service of the biometric data BD may execute the main processing for registering the biometric data BD. For example, when the registration destination of the biometric data BD is a card C, the issuer's computer system 4 may receive the biometric data BD from the computer system of the service provider and store the received biometric data BD in the card C.

The server device 41 is connected to a network line. The network line may be, for example, the Internet, an intranet, or the like. The information processing device 2 operated by the user U can access the server device 41 via the network line. The server device 41 executes processing such as registration of the biometric data BD of the user U and biometric authentication.

In the present embodiment, the server device 41 transmits data to be displayed on the display unit 26 to the information processing device 2, the information processing device 2 accepts the data input by the user U according to the data displayed on the display unit 26, the server device 41 receives the biometrics data BD and data necessary for registration of the biometrics data BD from the information processing device 2, and the server device 41 thereby accepts the registration of the biometric data BD. For example, however, the server device 41 may download the application program to the information processing device 2 and accept the registration of the biometric data BD by the cooperative operation of the application program and the server device 41.

In the present embodiment, it is assumed that the data necessary for registering biometric data BD, which is received from the information processing device 2 by the server device 41, includes, for example, a security algorithm 422, user data 423, or security data DD. The user data 423 includes, for example, the name, address, telephone number, occupation and the like of the user U. The security algorithm 422 is, for example, a process or a procedure for increasing the security of card payment of the user U. The security data DD is data used to turn on (lock) and off (unlock) the security of the biometric data BD. The security of the biometric data BD is switched between on and off by biometric data BD being encrypted and decrypted, or by biometric data BD being locked or unlocked with a password. The security data DD may include, for example, an encryption key and a decryption key or a password.

The server device 41 includes, for example, a communication unit 412, a processor P2, and a memory 4M. At least one of the communication unit 412 and the memory 4M may be a device externally attached to the server device 41.

The communication unit 412 transmits and receives commands, addresses, data, information, instructions, signals, and the like to and from other devices such as the information processing device 2, the acquirer's computer system 5, the computer system 6 of the card brand, and the computer system 7 of the third-party authentication agency.

When the user U registers the biometric data BD, the communication unit 412 receives the biometric data BD and the data necessary for registration of the biometric data BD from the information processing device 2.

In addition, the communication unit 412 transmits and receives the biometric data BD, the data necessary for registration of the biometric data BD, payment data, and the like to and from the other computer systems.

In the present embodiment, the data necessary for registration of the biometric data BD which the communication unit 412 transmits to and receives from the other computer system includes, for example, the security algorithm 422, the user data 423, the security data DD, or the card data CD. The card data CD includes, for example, the name, address, telephone number, and occupation of the user U, the card number and expiration date of the card C, and the like, which are required for payment using the card C.

The processor P2 may be, for example, a CPU, an MPU, a DSP, or the like. The memory 4M may be used as, for example, a main memory. The memory 4M follows a control from the processor P2. In the memory 4 M, data processed by the processor P2 and the like are provisionally stored under control of the processor P2. The memory 4M stores, for example, control software 4SW in a nonvolatile storage area. The memory 4M may be included in the processor P2.

The processor P2 may implement the functions of a control unit 413, a registration unit 414, a security registration unit 415, and a biometric authentication unit 416 by executing the control software 4SW of the memory 4M.

The control unit 413 controls the communication unit 412, the registration unit 414, the security registration unit 415, the biometric authentication unit 416, and the memory 4M included in the server device 41.

When the user U registers the biometric data BD, the registration unit 414 transmits to the information processing device 2 screen data for instructing the user U to input the biometric data BD. The screen data is displayed on the display unit 26 of the information processing device 2. The screen data displayed on the information processing device 2 may be, for example, data of a website for biometric data registration provided by the issuer's computer system 4.

More specifically, the user U specifies a Uniform Resource Locator (URL) of the website for biometric data registration on the browser of the information processing device 2. As a result, the information processing device 2 transmits a request to the server device 41 designated by the URL, and the communication section 412 of the server device 41 receives the request from the information processing device 2 and transmits the screen data provided by the registration section 414 to the information processing device 2. The information processing device 2 receives the screen data, and the display unit 26 displays the screen data. The user U views the displayed screen data and executes an input or operation for registering the biometric data BD in the card C or at least one of plural computer systems.

The registration unit 414 stores in the database 42 the biometric data BD and the user data 423 acquired from the information processing device 2 via the communication unit 412 by the server device 41 in association with each other. The security of the biometric data BD transmitted from the registration unit 414 to the other server device via the communication unit 412 may be turned on by a security registration unit 415 explained below. The details of the biometric data registration processing executed by the registration unit 414 will be explained below with reference to FIG. 2 to FIG. 4.

The registration unit 414 may generate the card data CD based on the user data 423 of the database 42 and store the biometric data BD, the user data 423, and the card data CD in the database 42 in association with each other. For example, the registration unit 414 generates card data CD by adding information such as the card number, validity period and the like to the user data 423. Incidentally, generation of the card data CD and storage of the card data CD in the database 42 may be executed by the control unit 413, the card generating device 43, or the like.

If the registration destination of the biometric data BD is the other computer system, the registration unit 414 transmits the biometric data BD and the data necessary for registration of the biometric data BD to the server device (for example, the server device 51, the server device 61, or the server device 71) of the other computer system via the communication unit 412.

In the present embodiment, the data necessary for registration of the biometric data BD, which is transmitted from the registration unit 414 to the other server device via the communication unit 412, includes, for example, the user data 423, the security data DD, or the card data CD.

For example, the security registration unit 415 stores the security algorithm 422 which the user U sets by viewing security screen data instructing the security setting displayed by the display unit 26, and the set security data DD, in the database 423 in association with the biometric data BD of the user U, the user data 423, and the card data CD. Plural security algorithms 422 and plural elements of security data DD may be associated with one element of the biometric data BD and stored in the database 42.

The security data DD may be freely settable by the user U or a business operator concerning payment. Security of the biometric data BD is not necessarily required to be turned on, and security data DD may be omitted if security of the biometric data may be off.

The security registration unit 415 turns on the security of the biometric data BD stored in the database 42 using the security data DD. Turning on the security of the biometric data BD can be changed to be off by using the security data DD. In addition to the biometric data BD, the security data DD may be used to protect unauthorized access to the user data 423 and the card data CD.

The security algorithm 422 is processing or a procedure for increasing the security of card payment of the user U. More specifically, for example, the security algorithm 422 may be processing of locking the biometric authentication or payment, or destroying the biometric data BD if it fails at a preset number of times for biometric authentication. For example, the security algorithm 422 may execute processing of notifying an abnormality or setting the card C to be unusable when the payment amount within a certain time exceeds a threshold value preset by the user U. For example, the security algorithm 422 may execute processing for notifying an abnormality or setting the card C to be unusable when the number of times of payment within a certain time exceeds the threshold value. For example, the security algorithm 422 may be processing which enables payment only in a region preset by the user U. The security algorithm 422 is not limited to the above-described processing, but may be freely set by the user U or a business entity involved in payment.

When the biometric data BD is stored in the database of the other computer system, the security registration unit 415 may transmit the security data DD to the computer system of the registration destination of the biometric data BD via the communication unit 412.

In a case where the payment is executed by the other computer system, the security registration unit 415 may transmit the security algorithm 422 to the computer system which executes the payment via the communication unit 412.

Incidentally, a part of or all of the communication unit 412, the registration unit 414, the security registration unit 415, and the biometric authentication unit 416 may be included in the control unit 413. The security registration unit 415 may be included in the registration unit 414.

The database 42 is connected to the server device 41 in a wired or wireless manner. The database 42 may store, for example, biometric data BD of the user U, user data 423 input by the user U, card data CD of the user U used for payment, a security algorithm 422, and security data DD in association with each other.

The card generating device 43 generates a biometric data storage card C of the user U, based on the biometric data BD, the security data DD, the card data CD and the like stored in the database 42. Security may be turned on for the biometric data BD stored in the card generating device 43 using the security data DD. For example, the card generating device 43 selects necessary information from the biometric data BD, the security data DD, the card data CD, and the like included in the database 42, and stores the biometric data BD, the security data DD, and the card data CD in the memory in the card C. For example, when the biometric data BD is not stored in the card C, the card generating device 43 may store the security data DD instead of the biometric data BD in the card C. In this case, at the time of payment, the security data DD stored in the card C is transmitted to the computer system which manages the security-on biometric data BD, and the security of the biometric data BD stored in the database is turned off by the security data DD, and biometric authentication is enabled in the server device. For example, when storing the biometric data BD having security turned off in the card C, the card generating device 43 does not need to store the security data DD in the card C. The card C is issued to the user U. The card C may store only the data used for turning off the security, of the security data DD.

The call center device 44 is connected to, for example, a telephone line. The telephone 3 of the user U can be connected to the call center device 44 via the telephone line. An operator O interacts with the user U, operates the call center device 44, performs registration of biometric data BD, biometric authentication, and the like. The call center device 44 accepts registration of the biometric data (for example, voice data) BD, setting of the security algorithm 422, registration of the user data 423, setting of the security data DD, and generation of the card data CD in accordance with the operation of the operator O, and stores the biometric data BD of the user U, the security algorithm 422, the user data 423, and the security data DD in association with each other, in the database 42, via the server device 41. The call center device 44 is an automatic answering system and the issuer's computer system 4 does not require the operation of the operator O and is unmanned and may store the data BD, the security algorithm 422, the user data 423, and the security data DD from the telephone 3 of the user U, in the database 42, based on voice input or button operation.

In the present embodiment, the call center device 44 may not be included in the issuer's computer system 4 as long as it can be connected to the issuer's computer system 4. If the information processing device 2 is connected to the telephone line, the information processing device 2 may be connectable to the call center device 44. The biometric data registration system 1 may include both the information processing device 2 and the telephone 3, or may include either of them.

The acquirer's computer system 5, the computer system 6 of the card brand, the computer system 7 of the third-party authentication agency included in the biometric data registration system 1 are connected to the network line like the issuer's computer system 4. The issuer's computer system 4, the acquirer's computer system 5, and the card brand computer system 6 cooperate to execute the payment processing. Details of the payment processing will be explained later with reference to FIG. 6 and FIG. 7. The computer system 7 of the third-party authentication agency executes authentication of the user U at the time of payment.

The acquirer's computer system 5 includes, for example, a server device 51 and a database 52. The server device 51 includes a biometric authentication unit 511. The server device 51 receives the biometric data BD, the payment data, the user data 423, the card data CD, the security data DD, and the like from the server device 41 of the issuer's computer system 4. The database 52 is connected to the server device 51 in a wired or wireless manner. The server device 51 stores the received biometric data BD, payment data, user data 423, card data CD, security data DD, and the like in association with each other, in the database 52. The server device 51 may receive the biometric data BD, the payment data, the user data 423, the card data CD, the security data DD, and the like from a server device (for example, the server device 61 or the server device 71) of the other computer system.

The computer system 6 of the card brand includes, for example, a server device 61 and a database 62. The server device 61 includes a biometric authentication unit 611. The server device 61 receives the biometric data BD, the payment data, the user data 423, the card data CD, the security data DD, and the like from the issuer's computer system 4. The database 62 is connected to the server device 61 in a wired or wireless manner. The server device 61 stores the received biometric data BD, payment data, user data 423, card data CD, security data DD and the like in association with each other, in the database 62. The server device 61 may receive the biometric data BD, the payment data, the user data 423, the card data CD, the security data DD, and the like from a server device (for example, the server device 51 or the server device 71) of the other computer system.

The computer system 7 of the third-party authentication agency includes, for example, the server device 71 and a database 72. The server device 71 includes a biometric authentication unit 711. The server device 71 receives the biometric data BD, the user data 423, the card data CD, the security data DD, and the like from the issuer's computer system 4. The database 72 is connected to the server device 71 in a wired or wireless manner. The server device 71 stores the received biometric data BD, user data 423, card data CD, security data DD, and the like in association with each other, in the database 72. Incidentally, the server device 71 may receive the biometric data BD, the user data 423, the card data CD, the security data DD, and the like from the server device (for example, the server device 51 or the server device 61) of the other computer system.

In the present embodiment, the server device 41 and the database 42 included in the issuer's computer system 4, the server device 51 and the database 52 included in the acquirer's computer system 5, the server device 61 and the database 62 included in the card brand computer system 6, and the server device 71 and the database 72 included in the computer system 7 of the third-party authentication agency can be freely combined. In other words, a certain business operator may concurrently serve at least two of the issuer, acquirer, card brand, and third-party authentication agency.

In the present embodiment, it is assumed that functions required for registration of the biometric data BD (for example, the registration unit 414, the security registration unit 415, and the like) are included in the issuer's computer system 4. However, the functions necessary for registration of the biometric data BD may be included in the other computer system (the acquirer's computer system 5, the card brand computer system 6, or the computer system 7 of the third-party authentication agency). In this case, the user U may allow to store the biometric data BD in a database of the other computer system, using a function necessary for registration of the biometric data BD provided in a certain computer system.

In the present embodiment, it is explained that the biometric data registration system 1 includes four computer systems but, if it includes a computer system having functions necessary for biometric data registration and payment, the biometric data registration system 1 may include one or more computer systems.

FIG. 2 is a flowchart showing a first example of the biometric data registration processing according to the present embodiment.

In step S201, the information processing device 2 connects to the server device 41 by an operation of the user U, and displays login screen data.

In step S202, the information processing device 2 accepts a login operation from the user U who views the login screen data and logs in to the registration unit 414 of the server device 41. The login may be executed by, for example, the user U inputting a user ID and a password issued preliminarily by the issuer. If the login is successful, the processing proceeds to step S203. If the login has failed, the processing returns to step S201. The information used for login is not limited to the user ID and password, but the information inherent to the user may be used.

In step S203, the registration unit 414 accepts a selection as to whether to input to a newly issued card or an issued card, from the information processing device 2 operated by the user U who views card type screen data. That is, the card type screen data includes a menu to select issuing a new card in which the biometric data BD is stored to the user U, or registering the card data CD or the user data 423 corresponding to the existing card possessed by the user U, in association with the biometric data BD, in at least one of the databases 42 to 72.

When new issuance of a card is selected by the user U, in step S204, the registration unit 414 accepts the user data 423 necessary for generation of the card data CD corresponding to the card, from the information processing device 2 operated by the user U who views input screen data of the user data 423. The user data 423 necessary for issuing a new card is, for example, a name, an address, a telephone number, an occupation, or the like.

If new issuance of the card is not selected, that is, if the input on the issued card is selected by the user U, the processing proceeds to step S205.

In step S205, the registration unit 414 accepts a selection of a user ID associated with the biometric data BD, from the information processing device 2 operated by the user U who views screen data for selecting the user ID. The user ID indicating a candidate of a user of the card may be stored in the database 42. The candidate of the user is, for example, a family member or the like. In this case, the registration unit 414 reads the user ID indicating the candidate of the user of the card from the database 42, and incorporates a list of read candidates in the screen data for the selection of the user ID. If there is only one candidate for the user of the card, step S205 may be omitted.

In step S206, the registration unit 414 receives a selection of the type of the biometric data to be registered from the information processing device 2 operated by the user U who views selection screen data of the type of the biometric data BD. If the type of biometric data to be registered is one, step S206 may be omitted.

In step S207, the registration unit 414 executes the registration processing of the biometric data BD. More specifically, the registration unit 414 transmits an acquisition request of the biometric data BD to the information processing device 2, receives the biometric data BD from the information processing device 2, and transmits the received biometric data BD in association with the user data 423 acquired in step S204, the user ID acquired in step S205 and the like, in the database 42. Details of the registration processing will be explained later with reference to FIG. 3.

In step S208, the registration unit 414 accepts a selection of the presence or absence of additional registration of the biometric data BD from the information processing device 2 operated by the user U who views additional registration screen data of the biometric data BD. If the biometric data BD is additionally registered, the processing returns to step S205 and the registration unit 414 accepts a selection of the user ID associated with the biometric data BD to be registered next. If biometric data BD is not additionally registered, the processing proceeds to step S209.

In step S209, if the biometric data BD successfully registered in the database 42 is not present, the registration unit 414 ends the processing. If there is biometric data BD successfully registered in the database 42, the processing proceeds to step S210.

In step S210, the registration unit 414 receives a selection of the registration destination of the biometric data BD from the information processing device 2 operated by the user U who views registration destination screen data instructing the selection of the registration destination. As the registration destination, for example, a card, an issuer, an acquirer, a card brand, or a third-party authentication agency is selected. That is, the registration destination screen data includes a menu for a selection of a card, an issuer, an acquirer, a card brand, or a third-party authentication agency as the registration destination of the biometric data BD. For example, when new issuance of a card is selected in step S203, the registration unit 414 may automatically select a newly issued card of the user or an issuer which is a card issuing company as the registration destination.

In step S211, the registration unit 414 stores the biometric data BD, the user data 423 accepted in step S204, and the like in the device corresponding to the registration destination selected in step S210.

For example, when the card is selected as the registration destination, the registration unit 414 stores the biometric data BD and the user data 423 in a database 42 that manages data stored in the card C in association with each other. The control unit 413, the registration unit 414, or the card generating device 43 generates the card data CD based on the user data 423, and stores the card data CD in association with the biometric data BD and the user data 423, in the database 42. The card generating device 43 generates the card C storing the biometric data BD and the card data CD, based on the biometric data BD and the card data CD. This card C is sent to the user U.

For example, when the issuer is selected as the registration destination, the registration unit 414 stores the biometric data BD and the user data 423 in association with each other, in the database 42.

For example, when the acquirer, the card brand, or the third-party authentication agency is selected as the registration destination, the registration unit 414 transmits the biometric data BD and the user data 423 to the server device 51, the server device 61, or the server device 61. The server device 51, the server device 61, or the server device 71 stores the received biometric data BD and the user data 423 in association with each other, in the database 52, the database 62, or the database 72.

In step S212, the security registration unit 415 accepts, from the information processing device 2 operated by the user U who views security screen data, the setting of the security data DD used for, for example, management of the biometric data BD such as the type of encryption or use of a password, and the setting of the security algorithm 422 for determining, for example, whether to permit payment such as a region where payment can be executed, the number of times of use, the use amount, and the like. The security registration unit 415 turns on the security of the biometric data BD stored in the device corresponding to the registration destination by using the security data DD, and stores the security data DD in association with the biometric data BD, the user data 423, and the card data CD, in the device corresponding to the registration destination. The security registering unit 415 associates the set security algorithm 422, the biometric data BD, the user data 423, and the card data CD with each other, and stores them in the database 42 corresponding to the server device 41 which executes the payment processing. The security registration unit 415 may transmit the security data DD to the server device of the registration destination of the biometric data BD. For example, the server device of the registration destination may store the biometric data BD, the user data 423, the card data CD and the received security data DD in association with one another, in a database corresponding to the server device of the registration destination.

When plural biometric data BDs are successfully registered, the security registration unit 415 may be able to register different security algorithms 422 and security data DD for each biometric data.

Incidentally, the server device which determines whether the payment is permitted or not may be replaced with the server device 51 or the server device 61 instead of the server device 41. The security algorithm 422 is desirably stored in a database corresponding to the server device which determines whether the payment is permitted or not.

Plural security algorithms or security data are prepared, and the security registration unit 415 may select a specific security algorithm or specific security data from the plural security algorithms or plural security data. The security algorithm or the security data may be set in advance by an issuer or may be set by the user U.

When newly issuing a card is selected in step S203 mentioned above, the card generation device 43 issues the card C after step S211 or step S212. When newly issuing a card is selected, in step S211, the biometric data BD, the security data DD, the user data 423 input by the user U in step S204, and the like may be transmitted directly to the card generating device 43 without being stored in the database 42, and the biometric data BD received by the card generating device 43, the security data DD, and the card data CD generated based on the user data 423 may be stored in the card C.

FIG. 3 is a flowchart illustrating the registration processing according to the present embodiment.

The processing in FIG. 3 corresponds to the registration processing in step S207 in FIG. 2. In FIG. 3, the information processing device 2 and the registering unit 414 cooperate and collaborate to execute processing for acquiring the biometric data BD of the user U.

In step S301, the control unit 24 of the information processing device 2 receives the registration screen data instructing the input of the biometric data BD from the registration unit 414 via the communication unit 412 and the communication unit 22, and displays the registration screen data on the display unit 26.

In step S302, the control unit 24 determines whether the information processing device 2 is capable of acquiring the biometric data BD or not.

If the biometric data BD can be acquired, the processing proceeds to step S305.

If the biometric data BD cannot be acquired, in step S303, the control unit 24 determines whether the acquired biometric data exists in the information processing device 2 or not, for example, whether the acquired biometric data is stored in the memory 2M or not. The acquired biometric data may be, for example, biometric data or the like obtained by the user U with the other device capable of acquiring the biometric data or the like and stored in the memory 2M of the information processing device 2.

If no acquired biometric data exists, the control unit 24 terminates the processing as a failure to acquire the biometric data.

If the acquired biometric data exists, in step S304, the control unit 24 reads the acquired biometric data from, for example, the memory 2M and the processing proceeds to step S315.

In step S305, the control unit 24 checks whether the acquired biometric data exists in the information processing device 2.

If no acquired biometric data exists, the processing proceeds to step S308.

If acquired biometric data exists, in step S306, the control unit 24 reads the acquired biometric data.

In step S307, the control unit 24 determines whether to execute a biometric data registration confirmation test on the acquired biometric data read in step S306 or not. If the biometric data registration confirmation test is executed, the processing proceeds to step S309.

If the biometric data registration confirmation test is not executed, the processing proceeds to step S315.

For example, if the biometric data registration confirmation test is executed at any time, if the biometric data registration confirmation test is unnecessary, or if it is automatically determined whether the biometric data registration confirmation test is executed or not, the determination processing of step S307 is unnecessary.

In step S308, the control unit 24 acquires the biometric data BD using the biometric data acquisition device 27.

In step S309, the control unit 24 provisionally registers the biometric data BD acquired in step S308 in the memory 2M of the information processing device 2. The provisional registration destination of the biometric data BD is not limited to the information processing device 2. In this case, the provisional registration destination of the biometric data BD may be, for example, the memory 4M or the database 42 of the server device 41.

In steps S310 and S311, the control unit 24 executes the biometric data registration confirmation test.

In step S310, the control unit 24 accepts the biometric data BD of the user U acquired by the biometric data acquisition device 27.

In step S311, the control unit 24 executes the biometric authentication (biometric data registration confirmation test), based on the biometric data BD provisionally registered in step S309 and the biometric data BD acquired from the user U in step S310.

In step S312, the control unit 24 determines whether the biometric data registration confirmation test has been successful or not.

If the biometric data registration confirmation test is successful, the processing proceeds to step S315.

If the biometric data registration confirmation test is failed, the control unit 24 may execute the biometric data registration confirmation test again or execute the provisional registration of the biometric data BD again. In this case, the control unit 24 may transmit a result of the biometric data registration confirmation test to the registration unit 414 of the server device 41 via the communication unit 22 and the communication unit 412. In step S313, the registration unit 414 transmits screen data including a menu which urges the user U to select executing the biometric data registration confirmation test or executing the provisional registration of the biometric data BD again, based on the received result of the biometric data registration confirmation test, to the information processing device 2 via the communication unit 412. The control unit 24 of the information processing device 2 receives the screen data via the communication unit 22, and the display unit 26 displays the screen data. The control unit 24 accepts a selection made by the user U, by the operation acceptance unit 23.

If the biometric data registration confirmation test is executed again, the processing returns to step S310.

If the provisional registration of the biometric data BD is executed again, the control unit 24 discards the provisionally registered biometric data BD in step S314, returns to step S308, and accepts again the biometric data BD of the user U acquired by the biometric data acquisition device 27.

In step S315, the control unit 24 transmits the biometric data BD to the registration unit 414 via the communication unit 22 and the communication unit 412. Then, the registration unit 414 stores the biometric data BD in the database 42.

In the arbitrary step included in FIG. 3, the display unit 26 may display a processing result of the registration processing, the processing content, a progress state of the processing, and the like, to notify the user U. In addition, in any step included in FIG. 3, the control unit 24 may transmit the processing result of the registration processing, the processing content, the progress state of the processing, and the like to the registration unit 414. In this case, the registering unit 414 may incorporate a message, a dialog box, a menu, or the like into screen data in accordance with the processing result, the processing content, the progress state of the processing, or the like, and transmit the screen data to the control unit 24.

If the biometric data already acquired is read in step S304, the registration unit 414 may include, for example, a notification which urges, before the first use time, the user U to execute the biometric data registration confirmation test, or the like, in the screen data, and may transmit the screen data to the control unit 24 since the authentication confirmation test of the read biometric data is not executed.

Figure 4:
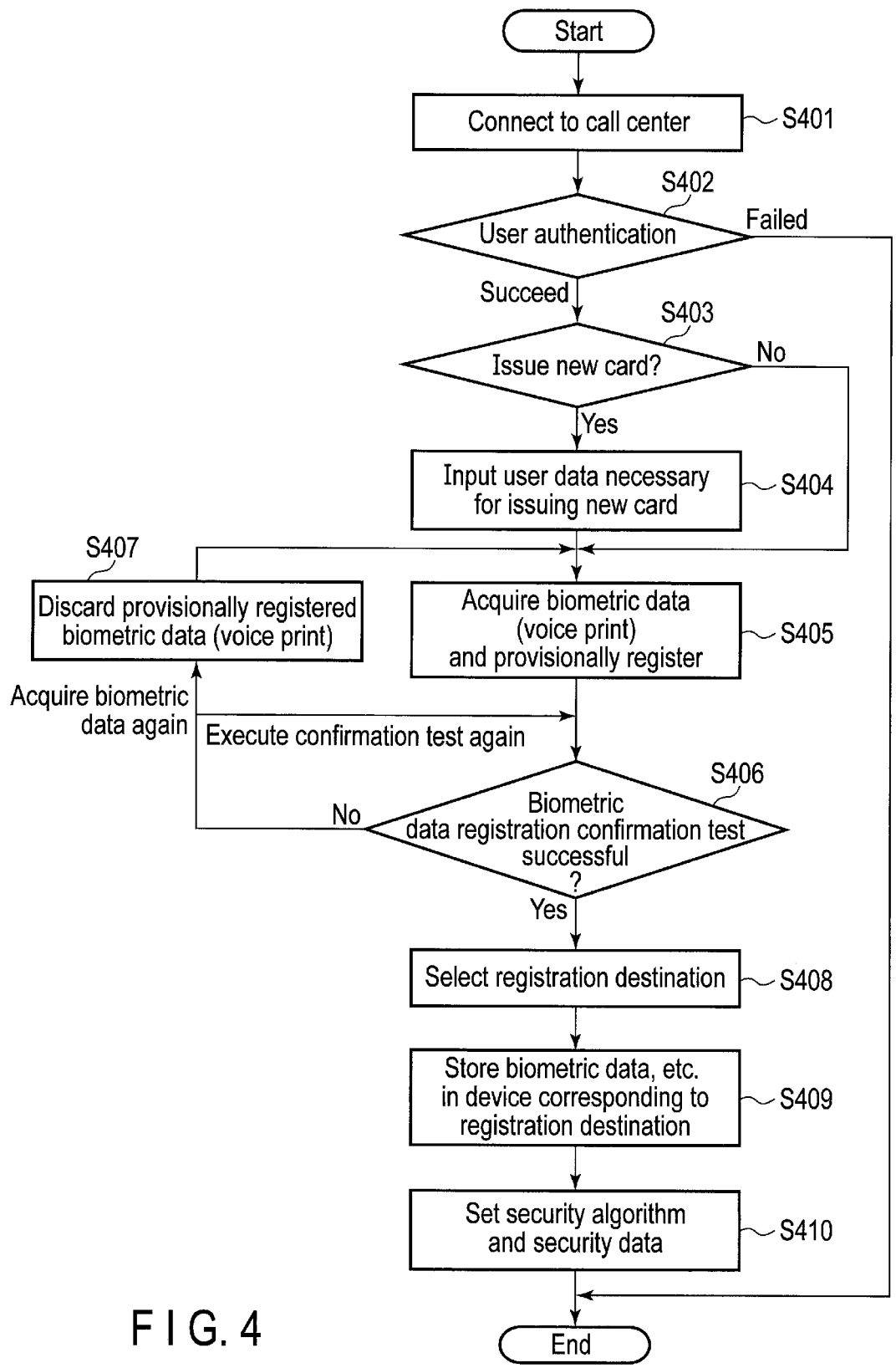
FIG. 4 is a flowchart showing a second example of biometric data registration processing according to the present embodiment.

FIG. 4 is a flowchart showing a second example of the biometric data registration processing according to the present embodiment. In FIG. 4, processing of registering the biometric data BD with the call center device 44 is exemplified. The operator O can use functions included in the call center device 44. The call center device 44 can use functions included in the server device 41 by accessing the server device 41. In FIG. 4, the telephone 3 may be included in the information processing device 2.

In step S401, the call center device 44 is connected to the telephone 3 according to the operation of the user U.

In step S402, the call center device 44 accepts a result of user authentication of the user U in accordance with operation of the operator O. For example, the user U may notify the operator O of the user ID and password preliminarily issued by the issuer, the operator 0 may collate the notified user ID and password with the user ID and the password of the user U registered in the database 42, and the user authentication may be thereby executed. In addition, the user authentication may be executed by transmitting a part of the user data 423 registered in the database 42 to the operator O by the user U. The specific method of the user authentication is not limited to the above-mentioned means. If the user authentication is successful, the processing proceeds to step S403. If the user authentication is failed, the processing ends.

In step S403, the call center device 44 accepts a selection as to whether to issue a new card for the user U or not in accordance with operation of the operator O. If a new card is issued, in step S404, the call center device 44 inputs the user data 423 of the user U necessary for issuing a new card in accordance with operation of the operator O and stores the data in the database 42 by using the server device 41. The user data 423 necessary for new issuance of the card is stored in advance in the database 42, and the call center device 44 may read the user data 423 from the database 42 and update the data. The call center device 44 may read the user data 423 from the database 42, generate the card data CD based on the user data 423, and store the card data CD in the database 42. If a card is not newly issued, the processing proceeds to step S405.

In step S405, the call center device 44 acquires the biometric data BD of voice of the user U from the telephone 3. More specifically, the operator O causes the user U to speak to the telephone 3 for a certain period of time. Then, the call center device 44 provisionally registers voice data acquired from the telephone 3 through the telephone line as the biometric data BD of voice in the database 42 or a storage device of the call center device 44.

In step S406, the call center device 44 executes a biometric data registration confirmation test using the biometric authentication unit 416 of the server device 41. More specifically, the call center device 44 acquires the biometric data BD from the user U and transmits the acquired biometric data BD to the biometric authentication unit 416. The biometric authentication unit 416 executes the biometric authentication based on the biometric data BD of the voice provisionally registered in step S405 and the biometric data BD of the voice acquired from the user U in step S406, and determines whether the provisionally registered biometric data BD matches the acquired biometric data BD or not. If the biometric authentication result is a failure, the call center device 44 may return to step S406 to execute the biometric data registration confirmation test again or may discard the biometric data BD of the voice provisionally registered in step S407 and return to step S405 to provisionally register the biometric data BD of voice from the user U again.

If the biometric authentication result is a failure, the processing proceeds to step S408.

In step S408, the call center device 44 accepts a selection of a registration destination of the biometric data BD. The selection of the registration destination may be input by the operator O in response to the request of the user U by the same selection as that in step S210 of FIG. 2. As the registration destination, the user's card or the issuer which is a card issuing company may be automatically selected.

In step S409, the call center device 44 stores the biometric data BD, the user data 423, and the like in association with one another with respect to the device corresponding to the registration destination selected in step S408 by using the registration unit 414. The processing in step S409 is the same as the processing in step S211 explained above.

In step S410, the call center device 44 accepts the setting of the security algorithm and the security data DD. Then, the call center device 44 registers the security algorithm 422 and the security data DD using the security registration unit 415. The processing in step S410 is the same as the processing in step S212.

FIG. 5 is a diagram showing an example of a screen transition in the biometric data registration system 1 according to the present embodiment.

The information processing device 2 receives and displays the card type screen data I1 for a selection of the processing for newly issuing a card or the processing for associating the biometric data BD with the issued card, from the server 41.

If a new card is issued, the information processing device 2 receives input screen data I2 for inputting the user data 423 of the user U from the server device 41, and displays the input screen data I2.

If associating the biometric data BD with the issued card is selected or after inputting the user data 423 of the user U, the information processing device 2 receives registration screen data I3 instructing the user U to input the biometric data BD from the server device 41, and displays the registration screen data I3.

The information processing device 2 receives registration destination screen data I4 instructing a selection of the registration destination of the biometric data BD from the server device 41 and displays the registration destination screen data I4.

Then, the information processing device 2 receives security screen data I5 instructing setting of the security algorithm 422 and the security data DD from the server device 41, and displays the security screen data I5.

The information processing device 2 transmits a selection, an instruction, or data input from the user U according to the screen transition to the server device 41.

Card payment processing of the electronic payment system will be explained with reference to FIG. 6 and FIG. 7.

FIG. 6 is a block diagram showing an example of a configuration of a card payment terminal using biometric authentication.

In the present embodiment, the card C of the user U stores, for example, card data CD including a card number D1, an expiration date D2, a name D3, biometric data BD, security data DD, and the like, which are examples of the card ID.

The biometric data BD and the security data DD may not be included in the card data CD. When included in the card data CD, the biometric data BD is collated with the biometric data D4 of the user U acquired at the payment in the biometric authentication. The security data DD is included in the card data CD, and is transmitted to a server device which executes the biometric authentication when the biometric authentication is executed by any one of the server devices.

The card data CD has already been stored in the card C, for example, when the card is issued. The card data CD is stored, for example, as at least one of magnetic information of the card C or information of an Integrated Circuit (IC) chip of the card C.

The card payment terminal 2A includes a card data reading unit 2Aa, a payment acceptance unit 2Ab, a processing unit 2Ac, and a communication unit 22.

The card payment terminal 2A may be the information processing device 2. In this case, the payment acceptance unit 2Ab and the processing unit 2Ac of the card payment terminal 2A correspond to the operation acceptance unit 23 and the control unit 24 of the information processing device 2, respectively.

In the present embodiment, a case where the card payment terminal 2A is installed in a member store of the card payment service will be explained as an example. The card payment terminal 2A may be an information processing device including a biometric data acquisition function, a card data reading function, a payment acceptance function, a biometric authentication function, and a communication function. The card payment terminal 2A may store the card data CD in the memory of the card payment terminal 2A and execute payment processing using the card data CD stored in the memory.

The functions of the card payment terminal 2A may be realized by software, may be realized by hardware, or may be realized by cooperation of software and hardware. Hardware necessary for realizing each function of the card payment terminal 2A may be built in the card payment terminal 2A or externally attached to the card payment terminal 2A.

The purchase of goods or services according to the present embodiment may be executed at a store or may be executed in an electronic commerce website or a service providing website on a network line.

The payment acceptance unit 2Ab accepts, for example, a payment amount, a payment method (for example, lumpsum payment or installment payment), and the like based on an operation of a store clerk B or the like of a member store, and sends the payment amount and the payment method to the processing unit 2Ac. The card data reading unit 2Aa reads the card data CD stored in the card C of the user U and sends the card data CD to the processing unit 2Ac.

The biometric data acquisition device 27 acquires the biometric data D4 at the card payment of the user U and sends the biometric data D4 to the processing unit 2Ac of the card payment terminal 2A.

The processing unit 2Ac determines whether the biometric data D4 of the user U at the time of payment has been read by the biometric data acquisition device 27 or not.

The processing unit 2Ac includes a biometric authentication unit 25.

The processing unit 2Ac determines whether the card data CD read by the card data reading unit 2Aa includes the biometric data BD or not. If the card data CD includes the biometric data BD, the biometric authentication unit 25 executes biometric authentication (collation) based on the biometric data BD of the card C and the biometric data D4 of the user U at the time of payment. If the security of the biometric data BD is on, the user U may input data necessary for turning off the security to the payment terminal 2A, and the biometric authentication unit 25 may turn off the security of the biometric data BD. In a case where the card data CD includes the security data DD, the biometric authentication unit 25 may turn off the security of the biometric data BD using the security data DD.

If the biometric data D4 of the user U at the time of payment is read and the biometric data BD is not included in the card data CD, the processing unit 2Ac generates payment data SDa including card number D1, expiration date D2, name D3, biometric data D4 at the time of payment of user U, payment amount D5, payment method D6, and security data DD, based on the card data CD, the payment amount, the payment method, and biometric data D4 of the user U at the time of payment.

In the present embodiment, if the biometric data D4 of the user U at the time of payment is read and the biometric data BD is not included in the card data CD, the processing unit 2Ac may execute the biometric authentication using the computer system 7 of the third-party authentication agency. More specifically, the processing unit 2Ac transmits the biometric data D4 and the security data DD to the server device 71 of the computer system 7 of the third-party authentication authority via the communication unit 22. If the biometric data BD for which the security of the user U is turned on is registered in the database 72, the biometric authentication unit 711 of the server device 71 turns off the security of the biometric data BD of the user U registered in the database 72 with the received security data DD, and executes the biometric authentication based on the biometric data D4 and the biometric data BD whose security is turned off. The biometric authentication unit 711 may compare the received security data DD with the security data DD stored in the database 72, turn off the security of the biometric data BD if they match, or turn off the security of the biometric data BD with the security data DD alone received by the server device 71. The server device 71 transmits a biometric authentication result to the processing unit 2Ac. The security of the biometric data BD may not be turned on.

Turning off the security of the biometric data BD executed by the biometric authentication unit (the biometric authentication unit 416, the biometric authentication unit 511, or the biometric authentication unit 611) of the other server device is the same as turning off the security as executed by the biometric authentication unit 711 explained above.

If the biometric data D4 of the user U at the time of payment is read, the biometric data BD of the card data CD is acquired, and the biometric authentication based on the biometric data BD of the card data CD and the biometric data D4 of the user U at the payment is successful by the biometric data acquisition device 27, the processing unit 2Ac generates the payment data SDb including the card number D1, the expiration date D2, the name D3, the authentication success notification D7, the payment amount D5, and the payment method D6, based on the card data CD, the payment amount, and the payment method.

The authentication success notification D7 includes an authentication executor ID (identification information) for specifying a person who has executed the biometric authentication. If the biometric authentication is successful in the processing unit 2Ac, the authentication performer ID may be, for example, an ID of a member store using the card payment terminal 2A, an ID of the card payment terminal 2A, an account ID of a member store or the like.

The processing unit 2Ac determines stopping the transaction based on the biometric authentication failure if the biometric data acquisition device 27 cannot acquire the biometric data D4 of the user U at the time of payment or if the biometric authentication based on the biometric data BD of the card C and the biometric data D4 of the user U at the payment is failed.

If the payment data SDa or the payment data SDb is generated, the processing unit 2Ac sends the payment data SDa or payment data SDb to the communication unit 22.

The communication unit 22 transmits the payment data SDa or payment data SDb to the server device 41 of the issuer's computer system 4 serving as a destination via the network line. The communication section 22 may transmit the payment data SDa or payment data SDb to the server device 41 of the issuer's computer system 4 via at least one of the server device 51 of the acquirer's computer system 5 or the server device 61 of the card brand computer system 6.

FIG. 7 is a block diagram showing an example of the configuration of the electronic payment system 1A using the biometric authentication.

The card payment terminal 2A, the issuer's computer system 4, the acquirer's computer system 5, the card brand computer system 6, and the computer system 7 of the third-party authentication agency are mutually connected by the network line.

As explained above with reference to FIG. 6, the card payment terminal 2A transmits the payment data SDb including the authentication success notification D7 if the biometric authentication is successful at the card payment terminal 2A and transmits the payment data SDa if the biometric authentication is not executed at the card payment terminal 2A, for example, to the server device 41 of the issuer's computer system 4, via the acquirer's computer system 5 and the card brand computer system 6. Furthermore, the card payment terminal 2A may transmit the biometric data D4 and the security data DD to the server device 71 of the computer system 7 of the third-party authentication agency, and may receive the biometric authentication result from the server device 71 (arrow A701).

The card payment terminal 2A transmits the payment data SDa or the payment data SDb to the acquirer's computer system 5 (arrow A702).

If the payment data received from the card payment terminal 2A is the payment data SDb, the data includes the authentication success notification D7, and the server device 51 of the acquirer's computer system 5 executes various necessary processing and transmits the payment data SDb to the card brand computer system 6 without executing the biometric authentication (arrow A705).

On the other hand, if the payment data received from the card payment terminal 2A is the payment data SDa, the server device 51 determines whether the biometric data BD of the user U is stored in the database 52 or not. If the biometric data BD is included in the database 52, the biometric authentication unit 511 included in the server 51 executes the biometric authentication based on the biometric data BD of the user U included in the database 52, and the biometric data D4 and the security data DD included in the payment data SDa. If the biometric authentication is successful, the server device 51 generates the payment data SDb by replacing the biometric data D4 of the payment data SDa with the authentication success notification D7, and transmits the generated payment data SDb to the card brand computer system 6. If the biometric data BD of the user U is not stored in the database 52, the server device 51 transmits the payment data SDa to the card brand computer system 6 (arrow A705).

If the server device 51 receives the payment data SDa from the card payment terminal 2A, that is, if the biometric authentication is incomplete in the electronic payment system 1A, the server device 51 may execute the biometric authentication using the computer system 7 of the third-party authentication agency. More specifically, the server device 51 transmits the biometric data D4 and the security data DD included in the payment data SDa to the server device 71 of the computer system 7 of the third-party authentication agency. In this case, if the biometric data BD of the user U is registered in the database 72, the biometric authentication unit 711 of the server device 71 uses the security data DD to turn off the security of the biometric data of the user U registered in the database 72 BD turn off, and executes biometric authentication based on biometric data D4 and biometric data BD whose security is turned off. The server device 71 transmits a biometric authentication result to the server device 51 (arrow A704).

If the biometric authentication in the server device 51 or the biometric authentication using the computer system 7 of the third-party authentication agency is failed, the server device 51 stops the transaction and notifies the card payment terminal 2A of the stop of the transaction (arrow A703).

In the card brand computer system 6, too, payment processing similar to the payment processing in the above-explained acquirer's computer system 5 is executed. That is, if the server device 61 receives the payment data SDb from the acquirer's computer system 5, the server device 61 executes various necessary processing without executing the biometric authentication and transmits the payment data SDb to the issuer's computer system 4 (arrow A708). In contrast, if the server device 61 receives the payment data SDa from the acquirer's computer system 5, the server device 61 determines whether the biometric data BD of the user U is stored in the database 62 or not. If the biometric data BD is included in the database 62, the biometric authentication unit 611 included in the server device 61 executes the biometric authentication based on the biometric data BD of the user U included in the database 62, and the biometric data D4 and security data DD included in the payment data SDa. If the biometric authentication is successful, the server device 61 generates the payment data SDb including the authentication success notification D7 and transmits the generated payment data SDb to the issuer's computer system 4. If the biometric data BD of the user U is not stored in the database 62, the server device 61 transmits the payment data SDa to the issuer's computer system 4 (arrow A708).

If the server device 61 receives the payment data SDa from the acquirer's computer system 5, that is, if the biometric authentication is incomplete in the electronic payment system 1A, the server device 61 may execute the biometric authentication using the computer system 7 of the third-party authentication agency (arrow A707). Processing in which the server device 61 in this case executes the biometric authentication using the server device 71 is the same as the above-explained processing in which the server device 51 executes the biometric authentication using the server device 71.

If the biometric authentication in the server device 61 or biometric authentication using the computer system 7 of the third-party authentication agency is failed, the server device 61 stops the transaction and notifies the card payment terminal 2A of stop of the transaction via the computer system 5 (arrow A706 and arrow A703).

If the server device 41 of the issuer's computer system 4 receives the payment data SDa from the card brand computer system 6, the server device 41 determines whether the biometric data BD of the user U is stored in the database 42 or not. If the biometric data BD is included in the database 42, the biometric authentication unit 416 included in the server device 41 executes the biometric authentication based on the biometric data BD of the user U included in the database 42, and the biometric data D4 and security data included in the payment data SDa. If the biometric authentication is successful, the server device 41 may generate the payment data SDb including the authentication success notification D7.

If the server device 41 receives the payment data SDa from the card brand computer system 6, that is, if the biometric authentication is incomplete in the electronic payment system 1A, the server device 41 may execute the biometric authentication using the computer system 7 of the third-party authentication agency (arrow A710). Processing in which the server device 61 in this case executes the biometric authentication using the server device 71 is the same as the above-explained processing in which the server device 51 executes the biometric authentication using the server device 71.

The server device 41 executes credit determination processing based on, for example, the presence/absence of success in the biometric authentication and the information included in the other payment data, and generates credit result data RD in which the credit result indicates OK or NG.

Furthermore, the server device 41 transmits the credit result data RD to the card payment terminal 2A via the server device 61 and the server device 51 (arrow A709, arrow A706, and arrow A703). The server device 61 and the server device 51 may execute various necessary processing based on the credit result data RD. The card payment terminal 2A may output payment completion or payment failure base on the credit result data RD.

The server device 41 of the computer system 4 determines whether to permit payment or not in accordance with the security algorithm 422 stored in the database 42, and executes payment processing when the payment is permitted.

In the above-explained present embodiment, the biometric data BD is included in at least one of the card C, the database 42 of the issuer's computer system 4, the database 52 of the acquirer's computer system 5, the database 62 of the card brand computer system 6, or the database 72 of the computer system 7 of the third-party authentication agency. The card C capable of determining whether the payment can be executed or not by the biometric authentication using the biometric data BD can be issued.

In the present embodiment, the biometric authentication can be executed with any one of the computer systems without reissuing the card C storing the biometric data BD, and the biometric authentication can be applied to the payment using the issued card.

In the present embodiment, the user U can select the registration destination of the biometric data BD. By using the biometric data registration system 1 according to the present embodiment, the flow of the registration processing and the procedure required for the user U can be unified, regardless of which registration destination the biometric data BD is registered, and the procedures of the user U can be facilitated.

In the present embodiment, even when the user U is not accustomed to the operation of the information device, the user U can connect to the call center device 44 using a telephone and register the biometric data BD of voice.

In the present embodiment, when the biometric data BD is registered, after provisionally registering the biometric data BD acquired from the user U, the biometric data registration confirmation test is executed and the biometric data BD in which the test is successful is stored in the card C, the databases 42 to 72, or the like. Thus, registration of incomplete biometric data (biometric data highly likely to fail in biometric authentication) can be prevented, frequency of change, correction and re-registration of the biometric data can be reduced, and the biometric data with high efficiency can be registered.

In the present embodiment, when the biometric data BD is registered, the registration unit 414 can set the security such as encryption using the security data DD in association with the biometric data BD. For example, the card payment terminal 2A transmits the security data DD registered in the card C to the server device which executes the biometric authentication, at the time of payment, and the biometric authentication unit included in the server device turns off the security of the biometric data BD with the security data DD. Thus, for example, since the payment using an illegally generated card C can be eliminated and protection against illegal access to the biometric data BD can be executed, the security of the biometric authentication can be enhanced.

In the present embodiment, the security algorithm 422 for determining whether to permit the payment or not can be set. Unauthorized payment can be thereby prevented.

In the present embodiment, if the card C is a debit card, at least one of the issuer's computer system 4, the acquirer's computer system 5, or the card brand computer system 6 may be a bank computer system.

In the present embodiment, the security algorithm 422 may be stored in any one of the databases 42 to 72 of the electronic payment system 1A by being set in a state associated with the biometric data BD or the card data CD.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A payment system comprising:
a first information processing device which stores pre-registered security data corresponding to a user or pre-registered first biometric data of the user, and accepts an operation for payment; and
a second information processing device which communicates with the first information processing device and executes payment processing for the user,
wherein
the first information processing device is configured to:
  determine whether the first biometric data is stored in the first information processing device or not if accepting the operation for payment;
  execute first biometric authentication based on the first biometric data and second biometric data of the user accepted by the operation for payment if the first biometric data is stored in the first information processing device;
  transmit first payment data including authentication success data to the second information processing device if the first biometric authentication succeeds; and
  transmit second payment data including the security data and the second biometric data to the second information processing device if the first biometric data is not stored in the first information processing device, and
the second information processing device is configured to:
  execute the payment processing based on the first payment data if receiving the first payment data;
  read third biometric data having security of the user secured from a database if receiving the second payment data;
  generate fourth biometric data having the security canceled using the security data included in the second payment data for the third biometric data;
  execute second biometric authentication based on the second biometric data included in the second payment data, and the fourth biometric data; and
  execute the payment processing based on the second payment data if the second biometric authentication succeeds.

2. The payment system of claim 1, wherein
the first information processing device accepts selection as to whether a destination of registration of the biometric data from the user is an integrated circuit or the second information processing device, and
the second information processing device stores the first biometric data in the integrated circuit if the selection indicates the integrated circuit, and stores the security data in the integrated circuit and stores the third biometric data having the security secured using the security data in the second information processing device if the selection indicates the second information processing device.

3. A biometric data registration system, comprising:
an information processing device; and
a server device configured to communicate with the information processing device,
wherein
the information processing device is configured to:
  accept a first selection as a selection of a registration destination of biometric data of a user;
  acquire the biometric data of the user; and
  transmit the biometric data and the first selection to the server device, and the server device is further configured to:
    receive the biometric data and the first selection from the information processing device; and
    store the biometric data in a first storage device for managing data to be stored in an integrated circuit for payment if the first selection indicates the integrated circuit, and store the biometric data in a second device corresponding to a registration destination server device if the first selection indicates the registration destination server device,
the first processing device is further configured to transmit security data for turning off security of the biometric data to the server device, and
the server device is further configured to receive the security data, and store the security data in the first storage device.

4. The biometric data registration system of claim 3, wherein
the server device is further configured to store the biometric data in which the security is turned on in the second storage device if the first selection indicates the registration destination server device, and
the biometric data registration system is configured to store the biometric data stored in the first storage device in the integrated circuit if the first selection indicates the integrated circuit, and store the security data in the integrated circuit if the first selection indicates the registration destination server device.

5. The biometric data registration system of claim 3, wherein
the information processing device is further configured to:
    accept a second selection as a selection of a newly issued card or an already issued card from the user;
    accept user data of the user from the user; and
    transmit the user data to the server device if the second selection indicates the newly issued card, and
the server device is further configured to:
    receive the user data if the user data is transmitted by the information processing device; and
    store the user data in the first storage device.

6. The biometric data registration system of claim 3, wherein
the information processing device is further configured to:
    acquire first biometric data and second biometric data of the user if the information processing device accepts an instruction of an input of the biometric data; and
    execute biometric authentication based on the first biometric data and the second biometric data and determine at least one of the first biometric data or the second biometric data as the biometric data of the user of a registration target if the biometric authentication succeeds.

7. The biometric data registration system of claim 3, wherein
the information processing device is further configured to:
    accept setting of a security algorithm determining whether to permit payment to the integrated circuit or not, from the user; and
    transmit the security algorithm to the server device, and the server device is further configured to:
    receive the security algorithm; and
    store the security algorithm in a third storage device corresponding to a payment server device executing payment to the integrated circuit.

8. The biometric data registration system of claim 3, wherein
the server device is a server device for any one of an issuer, an acquirer, a card brand, or an authentication agency.

9. A payment system executing payment comprising the biometric data registration system of claim 4, wherein
the payment system further comprises a card payment device and a payment server device,
the card payment device is configured to:
    accept a payment amount;
    read card data stored in the integrated circuit and including card identification information;
    acquire first biometric data of the user;
    executes, if the biometric data is included in the card data, biometric authentication based on the first biometric data and the biometric data included in the card data;
    generate, if the first biometric data is acquired and the biometric data is not included in the card data, first payment data including the card identification information, the payment amount, the first biometric data, and the security data, and transmit the first payment data to the payment server device;
    generate, if the first biometric data is acquired, the biometric data is included in the card data, and the biometric authentication succeeds, second payment data including the card identification information, the payment amount, and an authentication success notification, and transmit the second payment data to the payment server device; and
    stop transaction if the biometric authentication fails, and
the payment server device is configured to:
    execute, if the payment server device receives the second payment data from the card payment device, payment processing based on the card identification information and the payment amount included in the second payment data;
    read, if the payment server device receives the first payment data from the card payment device, the biometric data in which the security is turned on from the second storage device, turn off the security of the biometric data read from the second storage device by the security data included in the first payment data, and execute biometric authentication based on the first biometric data included in the first payment data and the biometric data in which the security is turned off;
    execute the payment processing if the biometric authentication at the payment server device succeeds; and
    stop the transaction if the biometric authentication at the payment server device fails.

* * * * *